(12) United States Patent
Hwang et al.

(10) Patent No.: US 9,275,296 B2
(45) Date of Patent: Mar. 1, 2016

(54) IMAGE PROCESSING APPARATUS AND METHOD THEREOF

(71) Applicant: SAMSUNG ELECTRONICS CO., LTD., Suwon-si (KR)

(72) Inventors: Hyo Seok Hwang, Seoul (KR); Huang Xiangsheng, Beijing (CN); Dong Soo Kim, Hwaseong (KR); Kyung Shik Roh, Seongnam (KR); Young Bo Shim, Seoul (KR); Suk June Yoon, Seoul (KR); Seung Yong Hyung, Yongin (KR); Won Jun Hwang, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 253 days.

(21) Appl. No.: 13/845,889

(22) Filed: Mar. 18, 2013

(65) Prior Publication Data

US 2013/0243337 A1    Sep. 19, 2013

(30) Foreign Application Priority Data

Mar. 19, 2012    (KR) .......................... 10-2012-0027493

(51) Int. Cl.
    *G06K 9/50*    (2006.01)
    *G06K 9/00*    (2006.01)
    *G06K 9/46*    (2006.01)
(52) U.S. Cl.
    CPC .............. *G06K 9/46* (2013.01); *G06K 9/00201* (2013.01); *G06K 9/00362* (2013.01)

(58) Field of Classification Search
    None
    See application file for complete search history.

(56) References Cited

U.S. PATENT DOCUMENTS

| | | | | |
|---|---|---|---|---|
| 6,664,956 | B1 * | 12/2003 | Erdem | 345/419 |
| 7,103,211 | B1 * | 9/2006 | Medioni et al. | 382/154 |
| 2009/0041337 | A1 * | 2/2009 | Nakano | 382/154 |
| 2012/0087539 | A1 * | 4/2012 | Chen et al. | 382/103 |

* cited by examiner

*Primary Examiner* — Daniel Mariam
(74) *Attorney, Agent, or Firm* — Harness, Dickey & Pierce, P.L.C.

(57) ABSTRACT

An image processing apparatus for searching for a feature point by use of a depth image and a method thereof are provided. The image processing apparatus includes an input unit configured to input a three-dimensional image having depth information, a feature point extraction unit configured to obtain a designated point from an object image extracted from the depth image to obtain a feature point that is located at a substantially farthest distance from the designated point, and to obtain other feature points that are located at substantially farthest distances from feature points that are previously obtained as well as the designated point. The apparatus includes a control unit configured to control the input unit and the feature point extraction unit so that time in estimating a structure of the object is reduced, and a recognition result is enhanced.

32 Claims, 24 Drawing Sheets

FIG. 4A

```
       0  1  2  3  4   X-AXIS
    0| 0  0  0  0  0 |
    1| 0  1  0  0  0 |
    2| 0  0 (1) 0  0 |
    3| 0  0  0  0  0 |
    4| 0  0  0  0  0 |
Y-AXIS
```

FIG. 5B

```
     0  1  2  3  4    X-AXIS
  0  X  X  13 13 X
  1  X  12 12 12 X
  2  X  12 ⑪ 12 13
  3  X  12 12 12 X
  4  X  X  X  X  X
```

Y-AXIS

IMAGE PROCESSING APPARATUS AND METHOD THEREOF

CROSS-REFERENCE TO RELATED APPLICATIONS

This application is related to, and claims priority to, Korean Patent Application No. 10-2012-0027493, filed on Mar. 19, 2012, in the Korean Intellectual Property Office, the disclosure of which is incorporated herein by reference.

BACKGROUND

1. Field

Embodiments of the present disclosure relate to an image processing apparatus and a method thereof, and more particularly, to an apparatus configured to search for a feature point of an object, e.g., a human body by using an image having depth information and a method thereof.

2. Description of the Related Art

A user interface, for example, for a game or a household appliance is being changed in various ways with the development of sensors. Noticeable changes in the user interface occurring in human recognition technology and motion recognition technology include configurations so that a command made by a person performing a direct motion is recognized to an object, and various contents are being developed by using the recognized motion.

In conventional technology, a method of searching for previously learned feature points by use of a sliding window is used. However, for the conventional technology as such, a long period of execution time is needed. In addition, the sliding window may need to be moved to an overall range, and in certain cases, the size of the window may need to be changed.

SUMMARY

It is an aspect of the present disclosure to provide an apparatus for searching for a feature point of an object, e.g., a human body by use of a depth image, and a method thereof.

Additional aspects of the disclosure will be set forth in part in the description which follows and, in part, will be obvious from the description, or may be learned by practice of the disclosure.

In accordance with an embodiment of the present disclosure, an image processing apparatus for searching for a feature point, e.g., of a user by use of a depth image includes an input unit, a feature point extraction unit and a control unit. The input unit may be configured to input a three-dimensional image having depth information. The feature point extraction unit may be configured to obtain a designated point, e.g., center of gravity from an object image, e.g., human image extracted from the depth image, to obtain a first feature point that is located at a substantially farthest distance measured, for example, in pixel units from the designated point e.g., center of gravity, and to obtain other, e.g., remaining feature points that are located, for example, at substantially farthest distances in pixel units from feature points that are previously obtained and the designated point, e.g., center of gravity. The control unit may be configured to perform control, e.g., overall control the input unit and the feature point extraction unit.

The feature point extraction unit may include a temporary list processing unit, a base list processing unit and a feature point processing unit. The temporary list processing unit may be configured to process a temporary list by sequentially searching position information of a current point that serves as a reference of searching and position information of a number, for example, eight peripheral points adjacent to the current point, determining a starting point that serves as an initial point of the searching of the feature point, and delivering the starting point to a base list processing unit. The base list processing unit may be configured to process a base list by sequentially searching the current point and the peripheral points, and assigning a surface score or a compensation value to all coordinates on the human image while having the starting point delivered from the temporary list processing unit as the initial point. The feature point processing unit may be configured to determine a feature point based on information obtained from the temporary list processing unit and the base list processing unit.

The temporary list may include one of the designated point, e.g., center of gravity, the feature point, and a candidate ideal point that has a possibility of serving as an ideal point.

The temporary list processing unit may be configured to sequentially search the position information of the current point and the position information of the peripheral points, and to determine the current point as the starting point in a case when the position information of each of the peripheral points is provided with a value of "0" and level information of the current point is provided with a value of "1".

The temporary list processing unit may be configured to sequentially search the position information of the current point and the position information of the peripheral points, and in a case when the position information of the peripheral point is provided with a value that is not "0" and a surface score of the peripheral point is present, to determine the current point not as an ideal point and determine the peripheral point not as the starting point.

The temporary list processing unit may be configured to sequentially search the position information of the current point and the position information of the peripheral points, and in a case when the position information of the peripheral point is provided with a value that is not "0" and a surface score of the peripheral point is not present, to determine the current point as the ideal point, and determine the peripheral point as the starting point.

The base list may include one of a starting point that is added by the temporary list processing unit and a neighboring point that is added by the base list processing unit.

The base list processing unit may be configured to sequentially search the current point and the peripheral points, to obtain a depth difference value that is referred to as an absolute value that is obtained by subtracting depth information of the peripheral point from depth information of the current point, and in a case when the depth difference value is below a threshold value, to determine the peripheral point as the neighboring point, and in a case when the depth difference value is equal to, or larger than, the threshold value, to determine the peripheral point not as the neighboring point.

The base list processing unit, in a case when the peripheral point is categorized as the neighboring point while the neighboring point is not assigned with a surface score and when the level information of the current point is equal to or larger a reference level, is configured to assign the neighboring point with a value of the level information of the current point plus "1".

The base list processing unit, in a case when the peripheral point is categorized as the neighboring point while the neighboring point is not assigned with a surface score and when the level information of the current point is below a reference level, may be configured to assign a compensation value to the neighboring point.

The base list processing unit, in a case when the peripheral point is categorized as the neighboring point and when the neighboring point is already assigned with a surface score, may be configured not to assign a surface value again to the neighboring point.

The base list processing unit, if at least one depth difference value that is equal to or higher than the threshold value is present at the time of the searching of all the peripheral points is completed, may be configured to determine the current point as the candidate ideal point, and to deliver the candidate ideal point to the temporary list processing unit, the depth difference value referred to as the absolute value obtained by subtracting the depth information of the peripheral point from the depth information of the current point.

The feature point processing unit may be configured to determine the feature point after performing the processing process on all elements of the temporary list and the base list, and to set a region having a largest surface score or a largest sum of surface scores as the feature point.

In accordance with an aspect of the present disclosure, an image processing method of searching for a feature point of a user by use of a depth image includes receiving by a feature point extraction unit a three-dimensional image having depth information. The feature point extraction unit may obtain a designated point, e.g., center of gravity from an object image, e.g., a human image extracted from the depth image, obtain a first feature point that is located at a substantially farthest distance measured in pixel units from the designated point, e.g., center of gravity, and obtain other feature points that are located, for example, at farthest distances in pixel units from feature points that are previously obtained and the designated point, e.g., center of gravity.

The obtaining of the feature point may be achieved, for example, by a temporary list processing unit that may process a temporary list by sequentially searching position information of a current point that serves as a reference of the searching and position information of eight peripheral points adjacent to the current point, determining a starting point that serves as an initial point of the searching of the feature point, and delivering the starting point to a base list processing unit. The base list processing unit may process a base list by sequentially searching the current point and the peripheral points, and assigning a surface score or a compensation value to all coordinates on the object image while having the starting point delivered from the temporary list processing unit as the initial point.

A feature point extraction unit may process a feature point by determining a feature point based on information obtained from the temporary list processing unit and the base list processing unit.

The temporary list may include one of the designated point, e.g., center of gravity, the feature point, and a candidate ideal point that has a possibility of serving as an ideal point.

The processing of the temporary list may be achieved by a feature point extraction unit that may sequentially search the position information of the current point and the position information of the peripheral points. The feature point extraction unit may determine the current point as the starting point in a case when the position information of each of the peripheral points is provided with a value of "0" and level information of the current point is provided with a value of "1".

The processing of the temporary list may be achieved by a feature point extraction unit that may sequentially search the position information of the current point and the position information of the peripheral points. The feature point extraction unit, in a case when the position information of the peripheral point is provided with a value that is not "0" and a surface score of the peripheral point is present, may determine the current point not as the ideal point and the peripheral point not as the starting point.

The processing of the temporary list may be achieved by a feature point extraction unit that may sequentially search the position information of the current point and the position information of the peripheral points. The feature point extraction unit, in a case when the position information of the peripheral point is provided with a value that is not "0" and a surface score of the peripheral point is not present, may determine the current point as the ideal point, and the peripheral point as the starting point.

The base list may include one of the starting point that is added by the temporary list processing unit and a neighboring point that is added by the base list processing unit.

The processing of the base list may be achieved by a feature point extraction unit that may sequentially search the current point and the peripheral points. The feature point extraction unit may obtain a depth difference value that is referred to as an absolute value that is obtained by subtracting depth information of the peripheral point from depth information of the current point. The feature point extraction unit may determine the peripheral point as the neighboring point in a case when the depth difference value is below a threshold value. The feature point extraction unit may determine the peripheral point not as the neighboring point in a case when the depth difference value is equal to or larger than the threshold value.

In the processing of the base list, in a case when the peripheral point is categorized as the neighboring point while the neighboring point is not assigned with a surface score and when the level information of the current point is equal to or larger than a reference level, the feature point extraction unit may assign the neighboring point with a value of the level information of the current point plus "1".

In the processing of the base list, in a case when the peripheral point is categorized as the neighboring point while the neighboring point is not assigned with a surface score and when the level information of the current point is below a reference level, the feature point extraction unit may assign a compensation value to the neighboring point.

In the processing of the base list, in a case when the peripheral point is categorized as the neighboring point and when the neighboring point is already assigned with a surface score, the feature point extraction unit may not assign a surface value again to the neighboring point.

In the processing of the base list, if at least one depth difference value that is equal to or higher than the threshold value is present at the time of the searching of all the peripheral points is completed, the feature point extraction unit may determine the current point as the candidate ideal point, and deliver the candidate ideal point to the temporary list processing unit, the depth difference value referred to as the absolute value that is obtained by subtracting the depth information of the peripheral point from the depth information of the current point.

In the processing of the feature point, the feature point extraction unit may determine the feature point after performing the processing process on all elements of the temporary list and the base list, and may set a region having a largest surface score or a largest sum of surface scores as the feature point.

In a case when the feature point is extracted by extracting a an object image, e.g., human image from depth image information, a considerable amount of time in estimating an overall structure of an object, e.g., overall bone structure of a human being is reduced, and an overall recognition result may be enhanced.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 4A to 4C illustrate an operation of a temporary list processing unit in accordance with an embodiment of the present disclosure.

FIGS. 5A to 5C illustrate an operation of a base list processing unit in accordance with an embodiment of the present disclosure.

DETAILED DESCRIPTION

Figure 1:
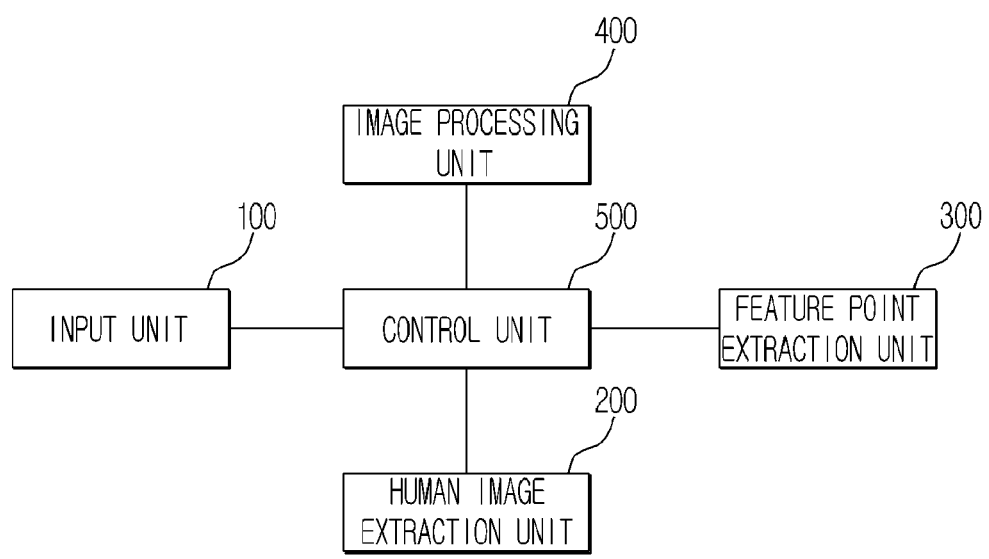
FIG. 1 illustrates an image processing apparatus in accordance with an embodiment of the present disclosure.

Reference will now be made in detail to the embodiments of the present disclosure, examples of which are illustrated in the accompanying drawings, wherein like reference numerals refer to like elements throughout.

With reference to adding reference numerals to the components of each drawing, with respect to the same components, although displayed on different drawings, the same reference numerals are provided as much as possible. In addition, with reference to describing the present disclosure, in a case when detailed descriptions regarding the related publications, components or functionalities may dilute the points of the present disclosure, the detailed descriptions as such will be omitted.

With reference to describing the components, the expressions such as "the first," "the second," "A," "B", "(a)", and "(b)", may be used. The expressions as such are configured to distinguish the components from other components, but the nature, the order, and the sequence of the corresponding components are not limited by the expressions. In a case when a certain component is mentioned to be "connected to," "couple to," or "linked to" another component, the component as such may be directly connected or linked, but a different component may be understood as being "connected to," "couple to," or "linked to" between each component.

FIG. 1 illustrates an image processing apparatus in accordance with an embodiment of the present disclosure.

An input unit 100 may input a three-dimensional depth image having depth information. For example, the input unit 100 may be a sensor capable of inputting a three-dimensional depth image.

An image extraction unit 200 may extract an object image, e.g., a human image from the three-dimensional depth image. In a three-dimensional depth image being initially input, other than the information on the object, e.g., human being desired to be recognized, e.g., for posture, various information such as a floor and a background may be included. Thus, the human image extraction unit 200 may assign labels according to the number of objects, e.g., human beings after extracting only the images from the three-dimensional depth image. According to an exemplary embodiment of the present invention, a plurality of objects, e.g., human beings may be extracted, but in the present disclosure, the example descriptions will be provided describe an image of one object, e.g., one human being is extracted.

Figure 3:
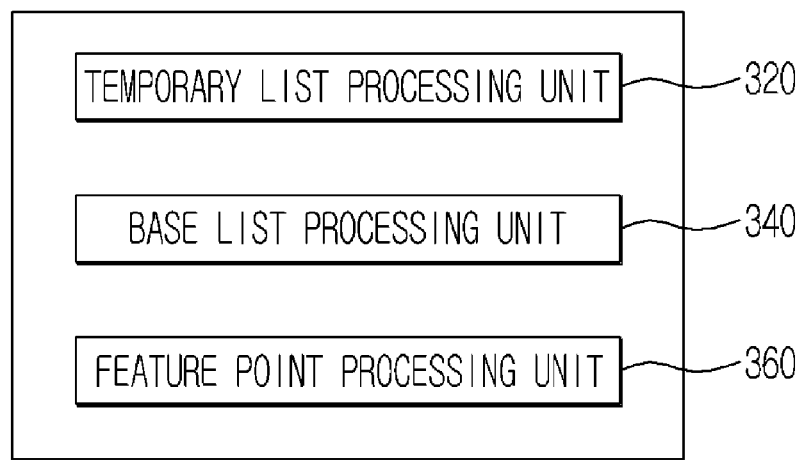
FIG. 3 illustrates a feature point extraction unit in accordance with an embodiment of the present disclosure.

A feature point extraction unit 300 may extract a feature point from an image of a human body that is extracted from the human image extraction unit 200. The feature point extraction unit 300 may obtain a designated point, e.g., a center of gravity from the human image that is extracted from a depth image, obtain a first feature point that is located at a substantially farthest distance, for example, measured in pixel units from the designated point, e.g., center of gravity, and obtain other, for example, remaining feature points that are located at substantially farthest distances in pixel units from the feature points that are obtained earlier and the center of gravity. FIG. 3 illustrates an exemplary feature point extraction unit 300.

An image processing unit 400 may recognize a structure of an object, e.g., the bone structure of a human being from the feature point that is extracted from the feature point extraction unit 300, and may recognize a motion of the object, e.g., the human being from the recognized bone structure of the human being.

A control unit 500 may perform control, e.g., an overall control.

Figure 2A:
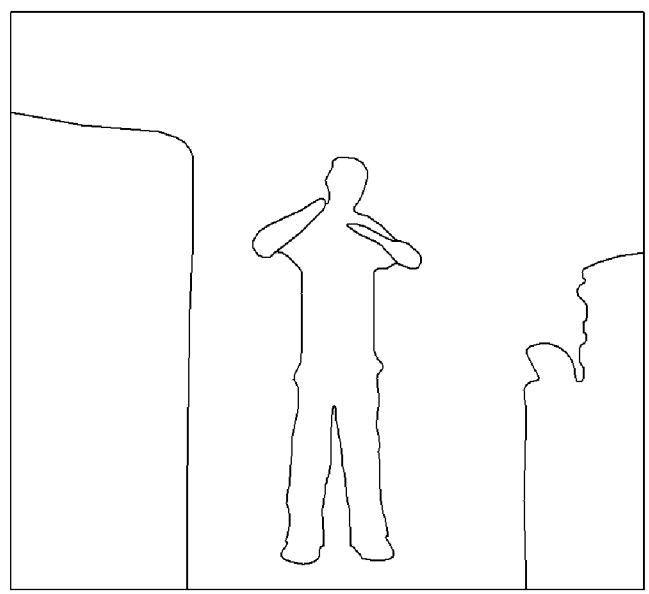
FIGS. 2A and 2B illustrate a three-dimensional depth image and an image of an object, e.g., a human being that is extracted from the three-dimensional depth image in accordance with an embodiment of the present disclosure.
Figure 2B:
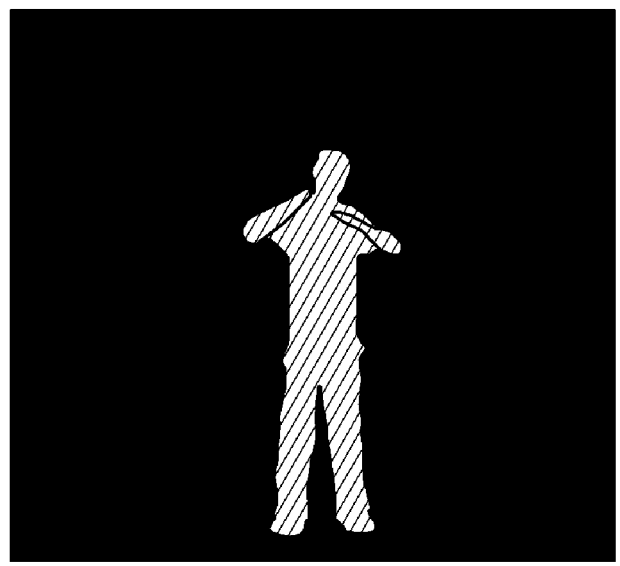

FIGS. 2A and 2B illustrate a three-dimensional depth image and an image of a human being that is extracted from the three-dimensional depth image in accordance with an embodiment of the present disclosure.

In the three-dimensional depth image being initially input, other than the information on the human being desired to be recognized for posture, various information such as a floor and a background may be included. The human image extraction unit 200 may extract only the image of a human being from an image having the three-dimensional depth image. An exemplary human image extracted from the three-dimensional depth image is illustrated on FIG. 2B.

FIG. 3 illustrates a feature point extraction unit in accordance with an embodiment of the present disclosure.

The feature point extraction unit 300 may include a temporary list processing unit 320, a base list processing unit 340, and a feature point processing unit 360. When determining a starting point, the feature point extraction unit 300 may initialize the coordinate information of the current point. The feature point extraction unit 300 may store the position information of the current point at the coordinate information of the current point, initialize the position information and the depth information of a peripheral point at "0", and initialize the level information of the current point at "1".

The temporary list processing unit 320 may deliver the starting point, which becomes the initial point of the search of the feature point, to the base list processing unit 340. The temporary list processing unit 320 may sequentially search the position information of the current point that becomes the reference of the search as well as the position information of eight peripheral points adjacent to the current point. The temporary list processing unit 320 may determine whether a candidate ideal point is an ideal point, and in a case when the candidate ideal point is the ideal point, the temporary list processing unit 320 may determine the starting point among the peripheral points, and deliver the determined starting point to the base list processing unit 340.

A temporary list may be defined as the list of the points from which the searching is started. The temporary list may include a starting point, which is designated at the time when a searching is started first, and a candidate ideal point, which is designated by the base list processing unit 340. The starting point designated at the time when the probing is started first may include a center of gravity of a human image, a feature point that is obtained shortly before, and a candidate ideal point, which may become an ideal point, determined by the base list processing unit 340.

The temporary list processing unit 320 may bring a single value from the temporary list, and determine the single value as a current point. The temporary list processing unit 320 may delete the value, which is brought, from the temporary list.

The temporary list processing unit 320 may sequentially search the current point and the peripheral points. The peripheral point may be referred to as a point that is located at a one pixel distance in pixel units from the position of the current point as a center. The number of the peripheral points per one current point may be eight. At each of the three-dimensional image, the position information of the current point, the level information of the current point, the position information of the peripheral point, and the three-dimensional depth information of the peripheral point may be included.

In a case when the position information of each peripheral position is provided with the value of "0" and when the level information of the current point is provided with the value of "1", the temporary list processing unit 320 may determine the current point as the starting point. Having the position information of each peripheral point with respect to the current point as the value of "0" is referred to having no peripheral point present at the current point. The temporary list processing unit 320 may deliver the current point to the base list processing unit 340 such that the current point is added to the base list.

In a case when the position information of the peripheral position is provided with a value other than "0" and when the surface score of the peripheral point is present, the temporary list processing unit 320 may determine the current point as not the ideal point, and may determine the current point as not the starting point. The temporary list processing unit 320 may initialize the position information and the depth information of the peripheral point.

In a case when the position information of the peripheral position is provided with the value other than "0" and when the surface score of the peripheral point is not present, the temporary list processing unit 320 may determine the current point as the ideal point, and may determine the current point as the starting point. In this case, the temporary list processing unit 320 may determine the current point as the starting point. The temporary list processing unit 320 may deliver the peripheral point to the base list processing unit 340 such that the peripheral point is added to the base list.

The temporary list processing unit 340 may end the processing of the temporary list when no single point is present on the temporary list.

The base list processing unit 340 may assign surface scores or compensation values to all coordinates on the human image while having the starting point, which is delivered from the temporary list processing unit 320, as the initial point. The base list processing unit 340 may sequentially search the current point, which becomes the reference of searching, and the eight peripheral points adjacent to the current point.

The base list processing unit 340 may assign a surface score or a compensation value to a neighboring point, and additionally designate the neighboring point as the base list. In a case when a candidate ideal point is found by the base list processing unit 340, the base list processing unit 340 may deliver the candidate ideal point to the temporary list processing unit 320 such that the candidate ideal point is added to the temporary list.

The base list processing unit 340 may bring a single value from the base list, and determine the single value as a current point. The base list processing unit 320 may delete the value, which is brought, from the base list. The base list may be one of a starting point, which is added by the temporary list processing unit 320, and a neighboring point, which is added by the base list processing unit 340.

The base list processing unit 340 may sequentially search the current point and the eight peripheral points adjacent to the current point. The peripheral point may be referred to as a point that is located at a one pixel distance in pixel units from the position of the current point. The number of the peripheral points per one current point may be eight.

The base list processing unit 340 may calculate the position information of the peripheral point. The base list processing unit 340 may calculate the depth difference value, which is referred to as the absolute value obtained by subtracting the depth information of the peripheral point from the depth information of the current point.

The base list processing unit 340 may sequentially search the current point and the peripheral points, and may determine whether the peripheral point, which is a subject of the searching, is the neighboring point.

The base list processing unit 340 may determine the peripheral point as the neighboring point in a case when the depth difference value is below a threshold value, and determine the peripheral point not as the neighboring point in a case when the depth difference value is equal to or larger the threshold value.

The base list processing unit 340, in a case when the searched peripheral point is categorized as the neighboring point, may determine the peripheral point as the neighboring point, and may also determine whether the neighboring point is assigned with a surface score. The surface score may be the level value or the compensation value at the corresponding point. In a case when the neighboring point as such is already assigned with a surface score, the base list processing unit 340 may not assign a surface score again to the neighboring point. In a case when the neighboring point is not assigned with a surface score, the base list processing unit 340 may determine whether the current point is located within a certain distance in pixel units from the starting point. The base list processing unit 340 may determine whether the current point is located within a certain distance in pixel units from the starting point, by comparing the level information with a reference level of the current point.

In a case when the level information of the current point is below the reference level, the base list processing unit 340 may assign a compensation value to the neighboring point, which is currently being searched. In a case when a feature point is extracted by the feature point extraction unit 300, as to prevent a next feature point from being extracted in a near distance from the previous feature point, the base list processing unit 340 may assign a compensation value to the neighboring point. The base list processing unit 340 may add the peripheral point, which is currently being searched, to the base list.

In a case when the level information of the current point is above the reference level, the base list processing unit 340 may assign a value to the neighboring point that is currently being searched, in which the value is referred to a value obtained by adding "1" to the level information of the current point. The base list processing unit 340 may add the peripheral point, which is currently being searched, to the base list.

In a case when at least one depth difference value exceeding a threshold value is present at the time when the base list processing unit 340 is ended with the searching of all the peripheral points, the base list processing unit 340 may determine the current point as the candidate ideal point, and deliver the candidate ideal point to the temporary list processing unit 320 such that the candidate ideal point is added to the temporary list.

The base list processing unit 340 may end the processing of the base list when none of the single starting point or the neighboring point is present on the base list.

The feature point processing unit 360 may determine the coordinate value of the feature point based on the information obtained from the temporary list processing unit 302 and the base list processing unit 340. The feature point may be a point that is located at the farthest distance in pixel units from the starting unit.

The feature point processing unit 360 may determine the feature point after performing the processing process on all the elements of the temporary list and the base list. The feature point processing unit 360 may determine a point having a largest surface score or a largest sum of surface scores as the feature point.

In a case when the center of gravity is determined as the starting point, the feature point processing unit 360 may determine a point, which is provided with the largest value of the surface score among all the pixels, as a first feature point. The first feature point may be referred to as a point that is located at the farthest distance in pixel units while having the center of gravity as the starting point. At this time, the feature point processing unit 360, in a case when a plurality of points provided with the same value of the surface scores thereof is present, may select a certain one point from the plurality of points.

The feature point processing unit 360 may determine the first feature point as a starting pointy to search for a second feature point. That is, the previous feature point may be the starting point to search for the next feature point.

The feature point processing unit 360, after the first feature point is determined, may sequentially determine a point, which is located at the farthest distance in pixel units from the center of gravity as well as from the feature point already found, as a remaining feature point. That is, the feature point processing unit 360, when the surface scores assigned to each pixel at a current stage and the surfaces scores assigned to each pixel to obtain a previous feature point are summed up, may determine a point having a largest sum of the surface scores as the feature point of the current stage. At The feature point processing unit 360, in a case when a plurality of points provided with the same value of the surface score thereof is present, may select one of the plurality of points as a feature point.

Figure 4B:
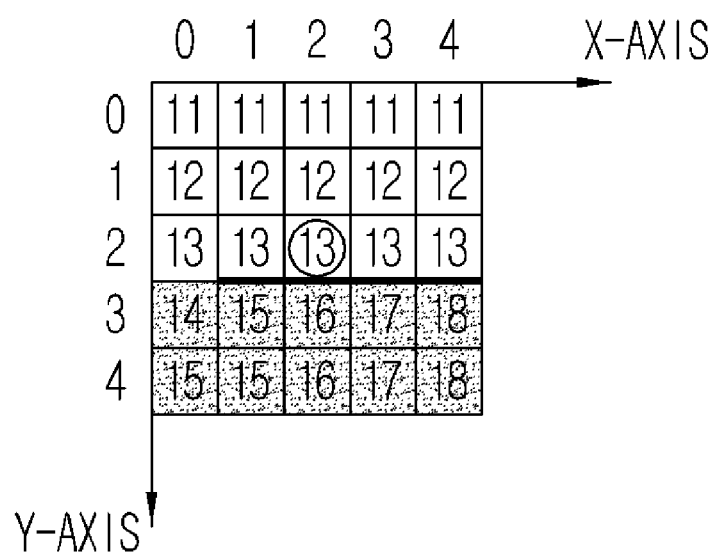
Figure 4C:
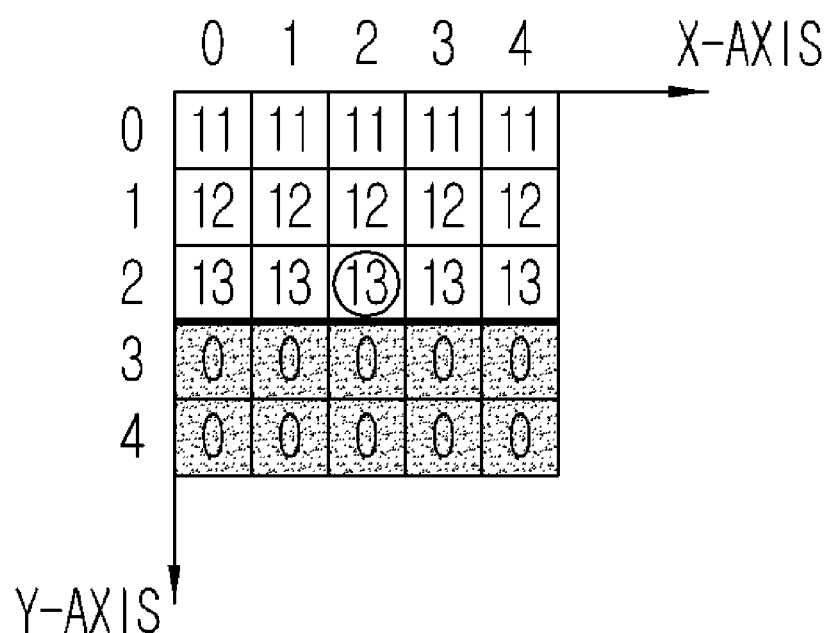

FIGS. 4A to 4C illustrate an exemplary operation of the temporary list processing unit in accordance with an embodiment of the present disclosure.

Hereinafter, the coordinate of the x-axis and the coordinate of the y-axis may be disclosed as "(x, y)". An image that is input in accordance with an embodiment of the present disclosure may have a size that may be represented by a 5×5 display. The points at which the y-coordinates are substantially 0, 1 and 2 may be displayed to be bright as the depth information of each point is small, and the points at which the y-coordinates are about 3 and 4 may be displayed to be dark as the depth information of the each point is large.

FIG. 4A illustrates an exemplary temporary list processing unit 320 determining a coordinate (2, 2) as a starting point. The position information of each peripheral point may be provided with the value of "0", and the level information of the coordinate (2, 2) of the current point may be provided with the value of "1". Accordingly, the temporary list processing unit 320 may determine the coordinate (2, 2) as the starting point. The temporary list processing unit 320 may deliver the coordinate (2, 2) serving as the current point to the base list processing unit 340 such that the coordinate (2, 2) is added to the base list.

FIG. 4B illustrates the temporary list processing unit 320 determining the peripheral point is not the starting point in a case when the depth information of the current point and the depth information of the peripheral point are in a continuous manner.

In a case when the depth information of the current point and the depth information of the peripheral point are continuous, the difference between the depth information of the current point and the depth information of the peripheral point is below the threshold value.

For example, assuming that the position of the current point is at (2, 2) on FIG. 4B, the current point may be the candidate ideal point, since the coordinate, which is provided with the distance that is not continuous in pixel units from the current point, is present as the peripheral point.

The temporary list processing unit 320 may sequentially search the coordinate information of (1, 1), (2, 1), (3, 1), (1, 2), (2, 2), (3, 2), (1, 3), (2, 3), and (3, 3). In a case when the coordinates of the peripheral points are (1, 1), (2, 1), (3, 1), (1, 2), (2, 2), and (3, 2), the position information of each peripheral point may have a predetermined value. In a case when the coordinates of the peripheral points are (1, 3), (2, 3) and (3, 3), the difference between the depth information of the current point and the depth information of the peripheral information is equal to or larger than the threshold value at the position of the current point, and thus the depth information may be determined as not continuous. However, each peripheral point may be treated as a candidate ideal point that has a possibility of being an ideal point at the position of the current point, but may be provide with continuous depth information at the position of the other point.

For example, the difference of the absolute value between the depth information of the point provided with the position of the coordinate of (2, 2) and the depth information of the point provided with the position of the coordinate of (1, 3) is equal to or larger than the threshold value, and thus the two points may be determined as not continuous. However, the coordinate (1, 3) may be continuous to the coordinate (0, 3), the coordinate (0, 3) may be continuous with the coordinate (0, 2), the coordinate (0, 2) may be continuous with the coordinate (1, 2), and the coordinate (1, 2) may be continuous with the coordinate (2, 2). As a result, the coordinate (1, 3) is provided with the depth information continuous with that of the current coordinate (2, 2).

Since the coordinate (0, 2) is provided with a continuous depth information with the coordinate (0, 3), and the depth information of the coordinate (0, 3) is continuous with the depth information of other coordinate, all the values within the depth image may be provided with the continuous depth information with one another. Thus, each of the coordinates within the depth image may be assigned with the position information and the surface score of the neighboring point.

As a result, the temporary list processing unit 320 may not determine the coordinate (2, 2) as the ideal point. Then, the temporary list processing unit 320 may initialize the position information and the depth information of the coordinate (1, 3). The temporary list processing unit 320 may delete the coordinate (1, 3) from the temporary list.

The temporary list processing unit 320 may repeat the process as such with respect to other candidate ideal point.

FIG. 4C illustrates the temporary list processing unit 320 determining the peripheral point as the starting point in a case when the depth information of the current point and the depth information of the peripheral point are not continuous with each other.

In a case when the depth information of the current point and the depth information of the peripheral point are not continuous with each other, the difference between the depth information of the current point and the depth information of the peripheral point is referred to as being equal to or larger than a predetermined value.

For example, assuming that the position of the current point is at (2,2) in FIG. 4C, the coordinate (2, 2) may be the ideal point, since a peripheral point, which is provided with the distance that is not continuous in pixel units from the current point, may be present. That is, the absolute values of the differences of the depth information of the coordinate (2, 2) with respect to the depth information of the coordinates (1, 3), (2, 3), and (3, 3) may be equal to or larger than a threshold value.

The temporary list processing unit 320 may sequentially search the coordinate information of (1, 1), (2, 1), (3, 1), (1, 2), (2, 2), (3, 2), (1, 3), (2, 3), and (3, 3). The temporary list processing unit 320 may determine whether each peripheral point is provided with the position information and the surface score. In a case when the coordinates of the peripheral points are (1, 1), (2, 1), (3, 1), (1, 2), (2, 2), and (3, 2), the surface score of each peripheral point may be provided with a predetermined value. In a case when the coordinates of the peripheral points are (1, 3), (2, 3), and (3, 3), the difference of the absolute value between the depth information of the current point and the depth information of the peripheral information is equal to or larger than a threshold value, and thus the depth information may be determined as not continuous. As a result, the coordinates (1, 3), (2, 3), and (3, 3) may not be assigned with the surface scores.

For example, the absolute value of the difference between the depth information of a certain one point among the points provided with the positions of the coordinates (0, 2), (1, 2), (2, 2), (3, 2), and (4, 2) and the depth information of a certain one point among the points provided with the positions of the coordinates (0, 3), (1, 3), (2, 3), (3, 3), and (4, 3) may be equal to or larger than a predetermined value. In the case as such, the coordinates from (0, 0) to (4, 2) on FIG. 4C may be assigned with surface scores, but the coordinates from (0, 3) to (4, 4) may not be assigned with surface scores. Thus, the temporary list processing unit 320 may determine a new starting point.

In the case as the above, the temporary list processing unit 320 may determine one of the coordinates (0, 2), (1, 2), (2, 2), (3, 2), and (4, 2) as an ideal point. The temporary list processing unit 320 may set the coordinate, which is determined as the ideal point prior to all other coordinates, as the current point, and by searching for a peripheral point assigned with position information but not with surface score, may determine the peripheral point as such as a new starting point, and deliver the peripheral point as such to the base list processing unit 340 such that the peripheral point as such is added to the base list.

Figure 5A:
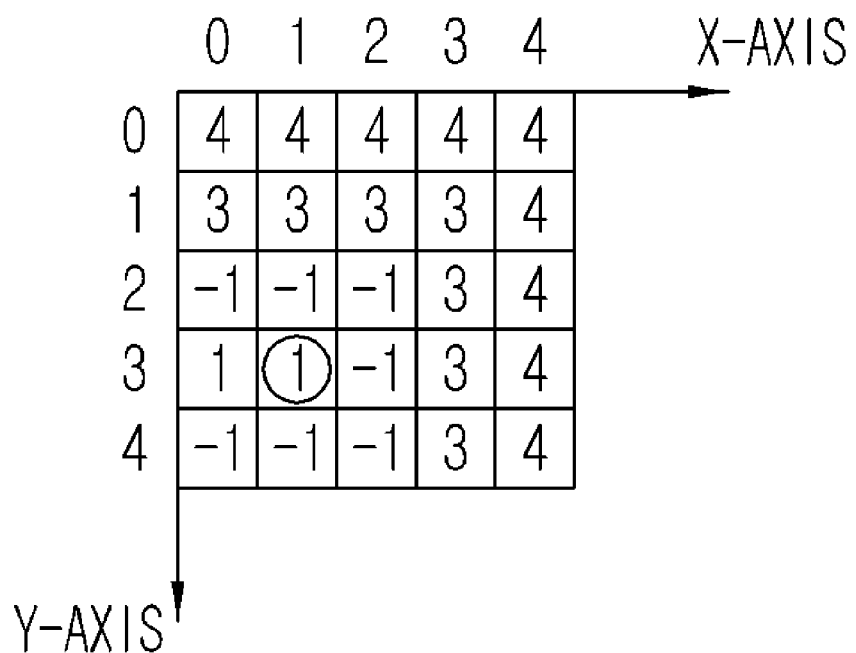
Figure 5C:
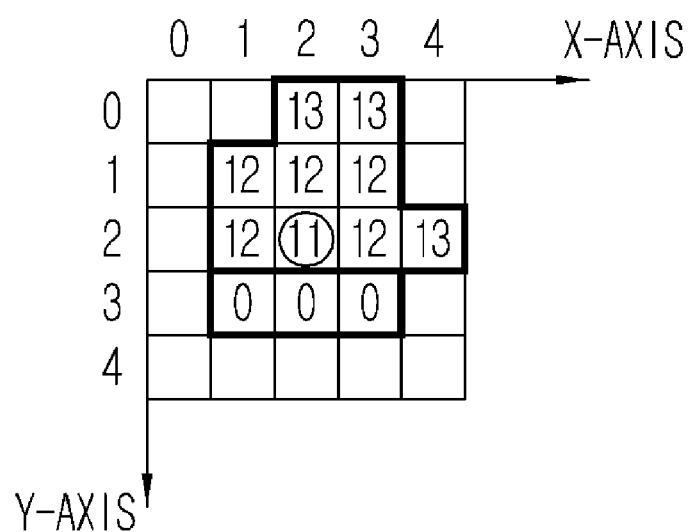

FIGS. 5A to 5C illustrate an operation of a base list processing unit in accordance with an embodiment of the present disclosure.

The coordinate of the x-axis and the coordinate of the y-axis may be displayed as (x, y). The image that is input in accordance with an embodiment of the present disclosure is provided with the size of 5×5. The portion displayed within the illustrated bold straight line may be an example of a human image extracted from a depth image.

FIG. 5A is a drawing showing an operation of the base list processing unit 340 assigning level information to the neighboring points from the starting point.

Assuming that the coordinate of the starting point is (1, 3), the reference level is "2", and the compensation value is "−1", the base list processing unit 340 may assign the compensation value of "−1" as the surface score to the point that is provided with the distance from the starting point at "1" in pixel units.

Then, the base list processing unit 340 may assign the points that are provided with the distance from the starting point at greater than "2" in pixel units with a value that is obtained by adding "1" to the level information of the current point, the value serving as a surface score.

Then, the base list processing unit 340, in a case when surface scores are assigned to all of the image that is input, may end the processing of the base list.

FIG. 5B illustrates an exemplary operation of the base list processing unit 340 assigning level information to the neighboring points from the current point.

Assuming that the coordinate of the current point is (2, 2) and the level information of the surface score of the current point is "11", the base list processing unit 340 may search eight peripheral points and determine whether the peripheral points are categorized to the neighboring points, respectively. The base list processing unit 340 may assign a value "12" as the surface score to each neighboring point while the value "12" is a value obtained by adding "1" to the level information "11" of the current point. The base list processing unit 340 may add each of the neighboring points to the base list.

The base list processing unit 340 may determine neighboring points again while having the neighboring points that are added to the base list as the current points, respectively, and may assign the surface scores. The base list processing unit 340 may search the peripheral point again while having the coordinate (1, 1) as the current point. At this time, the base list processing unit 340 may disregard the peripheral points that are not of a human image in the image being input. The base list processing unit 340 may not assign surface scores again to the neighboring points that are assigned with surface scores. Thus, the base list processing unit 340 may assign the surface score of "13'" to the coordinate (2, 0) that is determined as the neighboring point and is not assigned with a surface score.

The base list processing point 340 may search the peripheral point again while having the coordinate (2, 1) as the current point. The base list processing unit 340 may assign the surface score of "13" to the coordinate (3, 0) that is determined as the neighboring point and is not assigned with a surface score.

The base list processing point 340 may search peripheral point again while having the coordinate (3, 1) as the current point. At this time, the base list processing unit 340 may assign the surface score of "13" to the coordinate (4, 2) that is determined as the neighboring point and is not assigned with a surface score.

FIG. 5C illustrates an exemplary operation of the base list processing unit 340 determining the current point as the candidate ideal point and delivering the current point to the temporary list processing unit.

The points at which the y-coordinates are about 0, 1 and 2 may be displayed to be bright as the depth information of each point is small, and the points at which the y-coordinates are about 3 may be displayed to be dark as the depth information of each point is large.

Assuming that the coordinate of the current point is (2, 2), that the surface score of the current point is "11", and that a case provided with the value of the y-coordinate of "3" is not considered as the neighboring point of the current point, the base list processing unit 340 may assign surface scores to all the neighboring points, respectively, and may not assign surface scores to the peripheral points that are not referred to as neighboring points. Thus, the base list processing unit 340 may not assign surface scores to the peripheral points that are provided with the coordinates (1, 3), (2, 3), and (3.3). In a case when the number of the peripheral points that are not referred to as the neighboring points is at least one, the base list processing unit 340 may determine the current point (2, 2) as the candidate ideal point, and deliver the candidate ideal point to the temporary list processing unit 320 such that the candidate ideal point is added to the temporary list.

FIGS. 6A to 6H illustrate an operation of a feature point processing unit in accordance with an embodiment of the present disclosure.

The coordinate of the x-axis and the coordinate of the y-axis may be displayed as (x, y). The image that is input in accordance with an embodiment of the present disclosure is provided with the size of 5×5. The portion displayed in bold straight line may be an example of a human image extracted from a depth image.

For example, assuming that the current point is provided with the coordinate (2, 2), that the reference level is '2', and that the compensation value is '−1', the process of the feature point processing unit 360 determining a feature point is as follows.

Figure 6A:
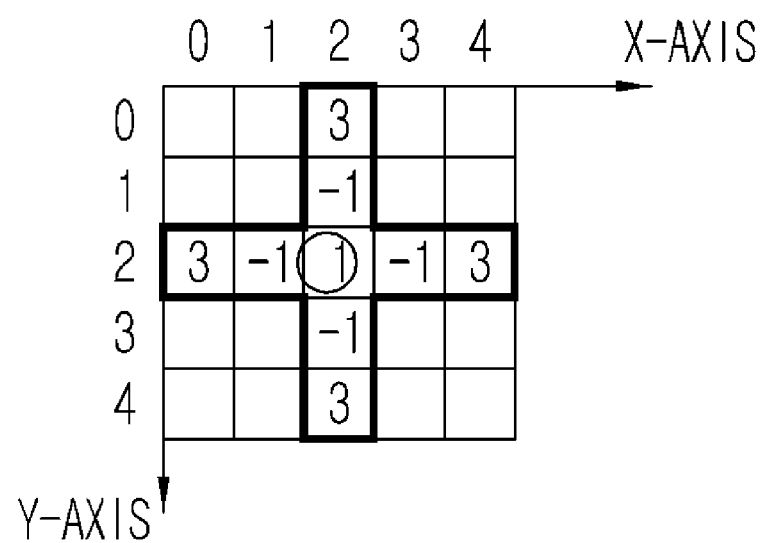
FIGS. 6A to 6H illustrate an operation of a feature point processing unit in accordance with an embodiment of the present disclosure.

Referring to FIG. 6A, while having the coordinate (2, 2) of the starting point as a reference, four points each provided with the surface score of "3" are illustrated. The feature point processing unit 360 may determine the coordinate (0, 2) as the first feature point. The feature point processing unit 360 may determine the first feature point as the starting point to search for the second feature point.

Figure 6B:
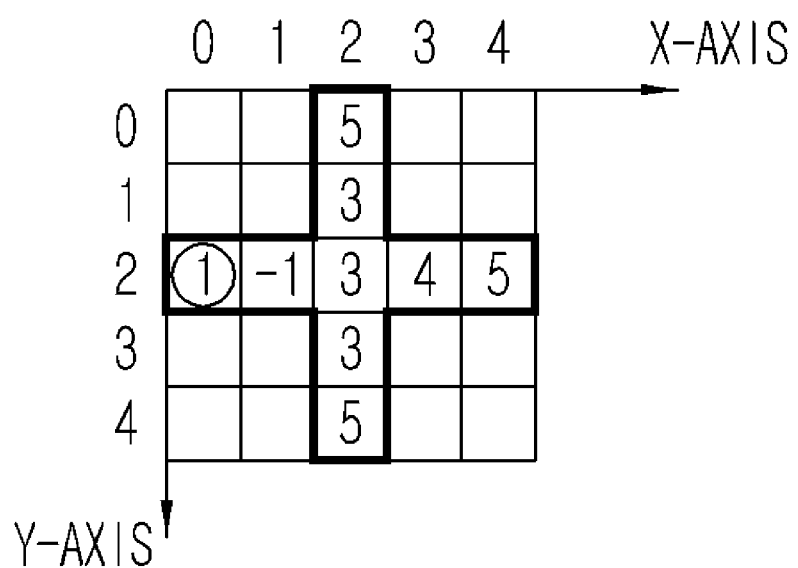

Referring to FIG. 6B, the surface scores are assigned while having the coordinate (0, 2) of the starting point as a reference.

Figure 6C:
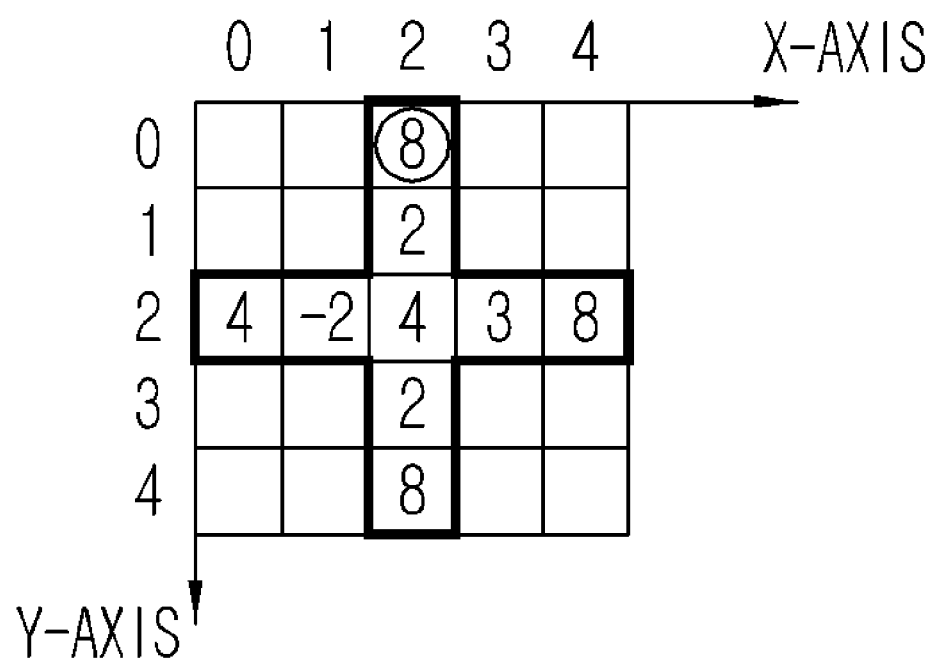

Referring to FIG. 6C, the feature point processing unit 360 may add the surface score, which is assigned to each neighboring point to search for the first feature point, to the surface score, which is assigned to each neighboring point to search for the second feature point. In the case as such, the total of three points may be present as the points having the sum of the surface scores at the level of '8', and the feature point processing unit 360 may determine the coordinate (0, 2) from the three points as the second feature point. The feature point processing unit 360 may determine the second feature point as the starting point to search for the third feature point.

Figure 6D:
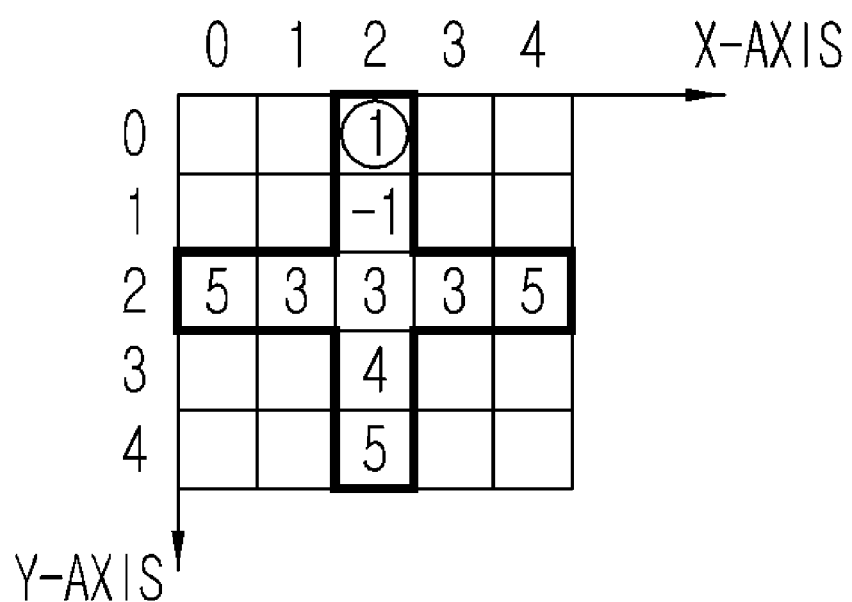

Referring to FIG. 6D, the surface scores are assigned while having the coordinate (0, 2) of the starting point as a reference.

Figure 6E:
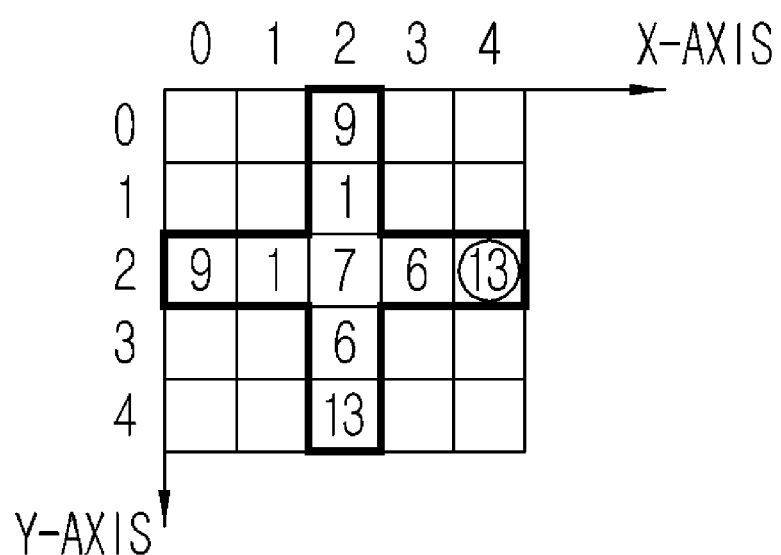

Referring to FIG. 6E, the feature point processing unit 360 may add the surface scores, which are assigned to each neighboring point to search for the first feature point, and the surface scores, which are assigned to each neighboring point to search for the second feature point and the third feature point. In the case as such, two points each having the sum of the surface scores of "13" are present, and the feature point processing unit 360 may determine the coordinate (4, 2) among the two points as the third feature point. The feature point processing unit 360 may determine the third feature point as the starting point to search for the fourth feature point.

Figure 6F:
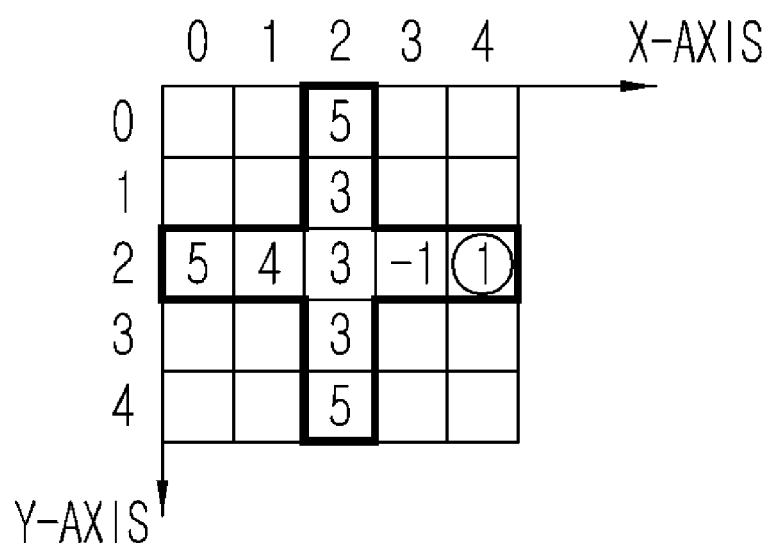

Referring to FIG. 6F, the surface scores are assigned while having the coordinate (4, 2) of the starting point as a reference.

Figure 6G:
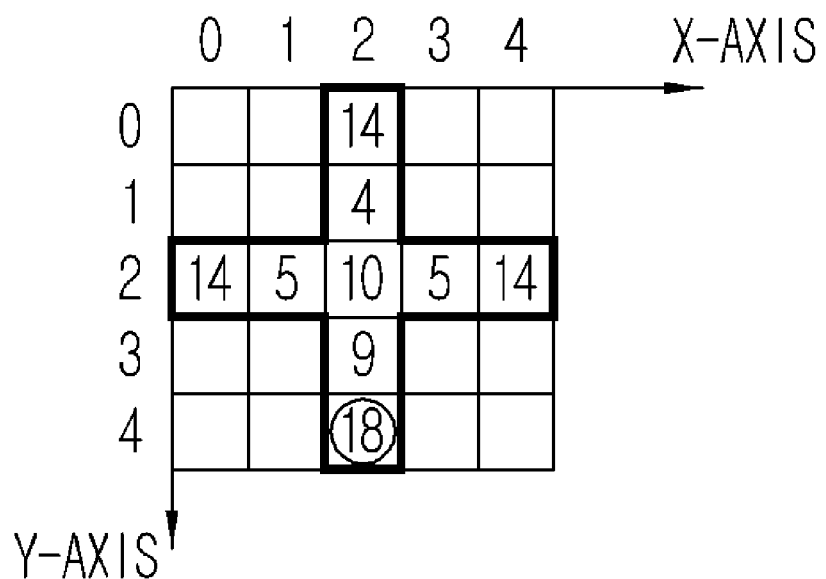

Referring to FIG. 6G, the feature point processing unit 360 may add the surface scores, which are assigned to each neighboring point to search for the first feature point, and the surface scores, which are assigned to each neighboring point to search for the second feature point, the third feature point, and the fourth feature point. In the case as such, a single point having the sum of the surface scores of '18' is present, and the feature point processing unit 360 may determine the coordinate (2, 4) of the point as the fourth feature point.

Figure 6H:
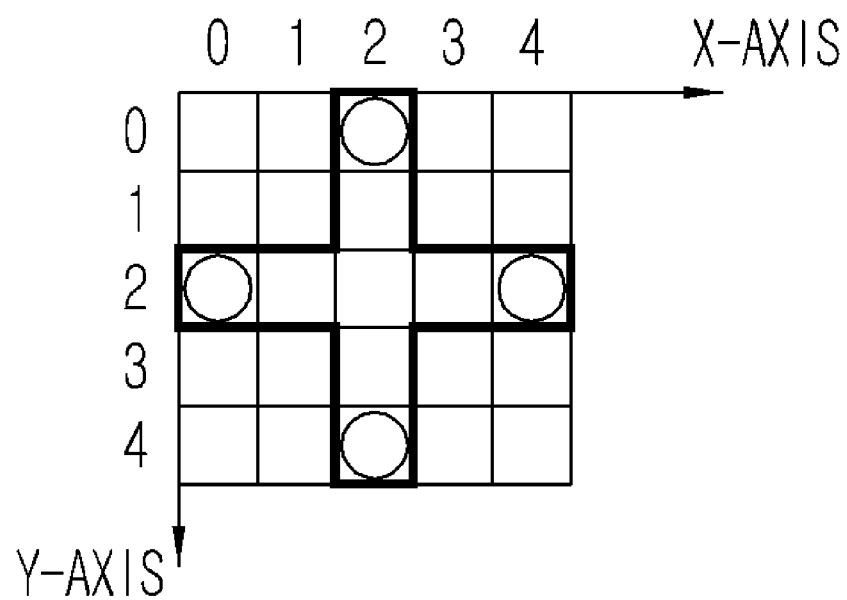

Referring to FIG. 6H, the feature point processing unit 360 determines the coordinates (0, 2), (2, 0), (4, 2), and (2, 4) as the four feature points.

Figure 7:
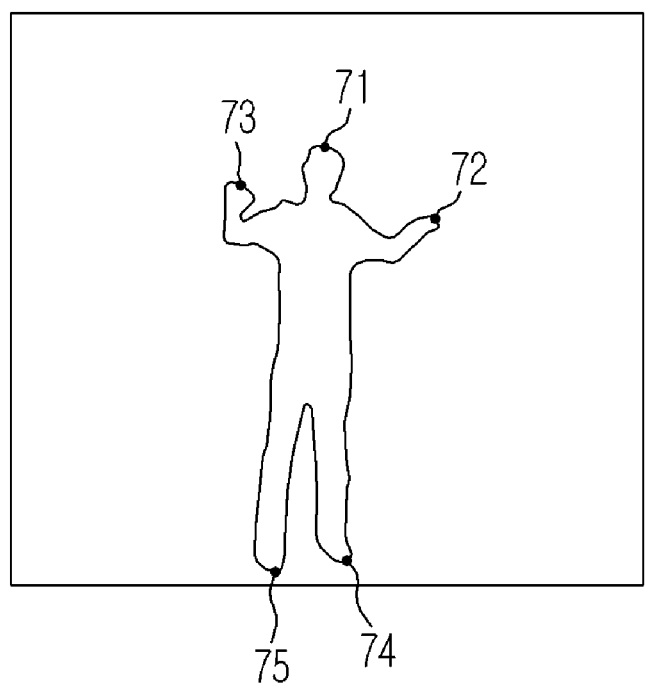
FIG. 7 illustrates a feature point with respect to an object image, e.g., a human image that is extracted by the feature point extraction unit in accordance with an embodiment of the present disclosure.

FIG. 7 shows feature points with respect to a human image extracted by the feature point extraction unit in accordance with an embodiment of the present disclosure.

The feature point extraction unit 300 may extract a head 71, a left hand 72, a right hand 73, a left leg 74, and a right leg 75 as feature points with respect to a human image. The feature point extraction unit 300 may perform an arithmetic calculation within a short period of time by using the method that is same as the above. The feature point extraction unit 300 may precisely recognize the feature point. Then, the feature point extraction unit 300 may deliver the information of the five feature points with respect to the human image to the image processing unit 400. The image processing unit 400 may recognize the bone structure of a human being by using the information of the feature points that is being delivered from the feature point extraction unit 300. As a result of the above, the image processing unit 400 may precisely recognize the motion of the human being.

Figure 8:
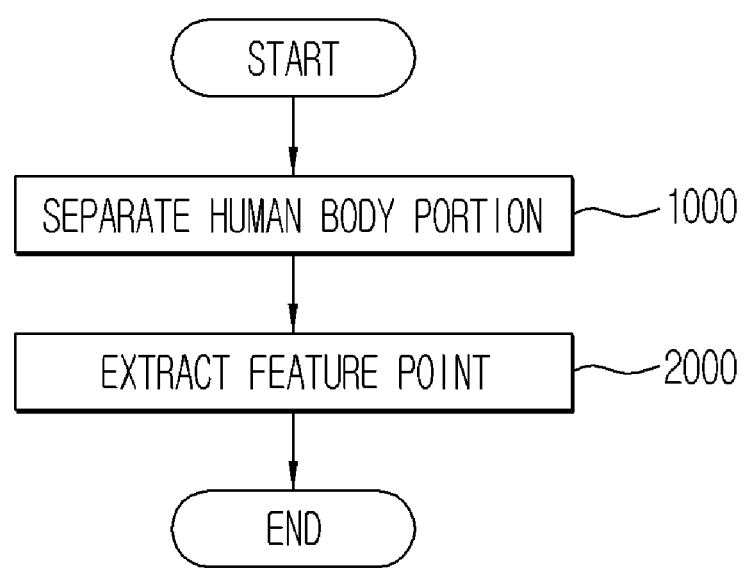
FIG. 8 illustrates a process of extracting a feature point of a human being from a depth image in accordance with an embodiment of the present disclosure.

FIG. 8 is a flow chart showing a process of extracting feature points of a human being from a depth image in accordance with an embodiment of the present disclosure.

The control unit 500 may extract an image of a human body from the image that is input (operation 1000).

The control unit 500 may extract a feature point from the human image that is extracted (operation 2000).

The process of the control unit 500 extracting the feature point will be described hereinafter in detail.

Figure 9:
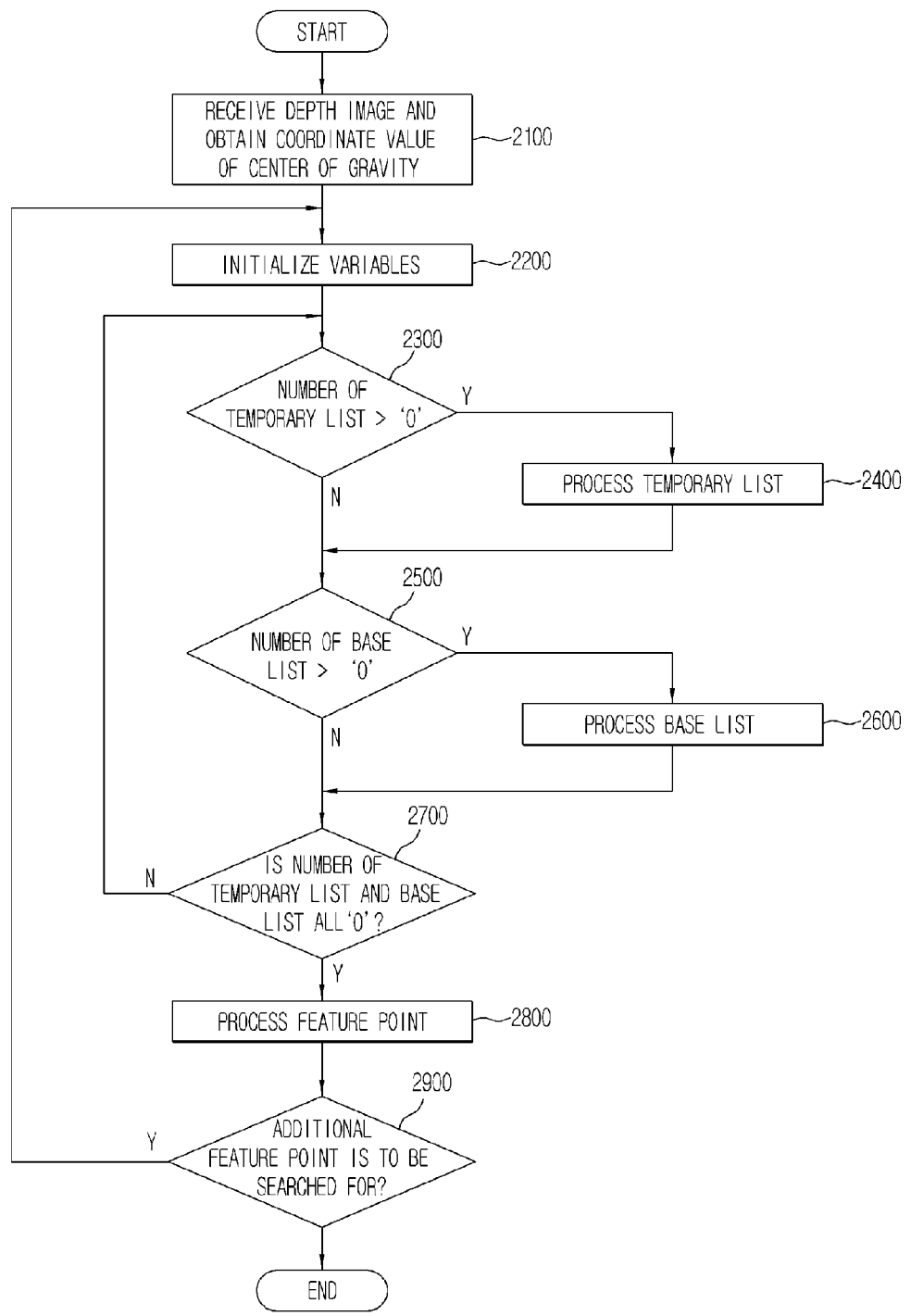
FIG. 9 illustrates a process of extracting a feature point in accordance with an embodiment of the present disclosure.

FIG. 9 illustrates an exemplary process of extracting a feature point in accordance with an embodiment of the present disclosure.

The feature point extraction unit 300 receives a depth image, and may obtain a center of gravity from the human image that is extracted (operation 2100).

The feature point extraction unit 300 may initialize the coordinate information of the current point. The feature point extraction unit 300 may store the position information of the current point at the coordinate information of the current point, initialize the position information and the depth information of the peripheral point at "0", and initialize the level information of the current point at "1" (operation 2200).

The control unit 500 may determine whether a temporary list is present (operation 2300), and if determined that the temporary list is present, the control unit 500 may have the temporary list processed (operation 2400).

The control unit 500 may determine whether a base list is present (operation 2500), and if determined that the base list is present, the control unit 500 may have the base list processed (operation 2600).

The control unit 500, in a case when both the temporary list and the base list are not present, may have the feature point processed, and in a case when the temporary list or the base list is present, the control unit 500 may have the temporary list processing process or the base list processing process repeated (operations 2700 and 2800).

The control unit 500, in a case when a feature point is needed to be additionally searched, may initialize all variables, and then repeat the temporary list processing process and the base list processing process, and in a case when a feature point is not needed to be additionally searched, the control unit 500 may end the feature point extracting process (operation 2900).

Figure 10:
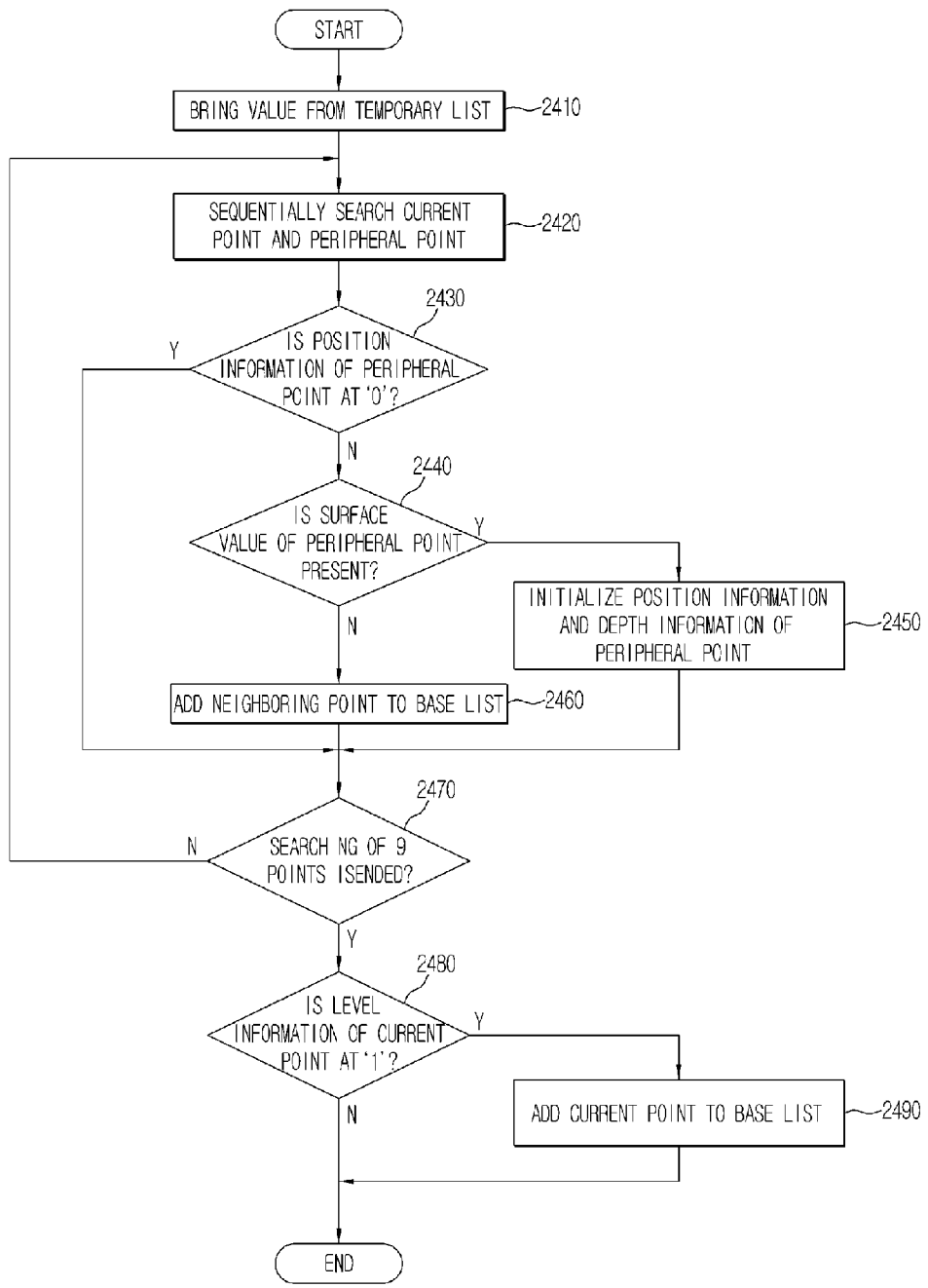
FIG. 10 illustrates a processing process of a temporary list in accordance with an embodiment of the present disclosure.

FIG. 10 is a flow chart showing a processing process of a temporary list in accordance with an embodiment of the present disclosure.

The temporary list processing unit 320 may deliver the starting point, which becomes the initial point of searching a feature point, to the base list processing unit 340. The temporary list processing unit 320 may sequentially search the position information of the current point, which becomes the reference of searching, and the position information of eight peripheral points adjacent to the current point. The temporary list processing unit 320 may determine whether a candidate ideal point is an ideal point, and in a case when the candidate ideal point is the ideal point, the temporary list processing unit 320 may determine a starting point among the peripheral points, and deliver the starting point to the base list processing unit 340.

A temporary list is referred to as the list of the points from which a searching is started. The temporary list may include the starting point, which is assigned at the time when a searching is started first, and the candidate ideal point, which is assigned by the base list processing unit 340. The starting point assigned at the time when a searching is started first may include the center of gravity of a human image, the feature point that is obtained shortly before, and the candidate ideal point that may become the ideal point, which is determined by the base list processing unit 340.

The temporary list processing unit 320 may bring a single value from the temporary list, and determine the single value as such as the current point. Then, the temporary list processing unit 320 may delete the value, which is brought, from the temporary list (operation 2410).

The temporary list processing unit 320 may sequentially search the current point and the peripheral points. The peripheral point may be referred to as the point that is located within a one pixel distance in pixel units while having the position of the current point as a center. The number of the peripheral points per one current point may be eight. Each point of the three-dimensional image may include the position information of the current point, the level information of the current point, the position information of the peripheral point, and the three-dimensional depth information of the peripheral point (operation 2420).

In a case when the position information of each peripheral point is provided with the value of "0" and when the level information of the current point is provided with the value of "1", the temporary list processing unit 320 may determine the current point as the starting point. Having the position information of each peripheral point with respect to the current point at the value of "0" is referred to as that no neighboring point is present at the current point. Then, the temporary list processing unit 320 may deliver the current point to the base list processing unit 340 such that the current point to the base list (operations 2430, 2470, 2480, and 2490).

In a case when the position information of each peripheral position is provided with the value other than "0" and when the surface score of the peripheral point is present, the temporary list processing unit 320 may determine the current point not as the ideal point, and may determine the peripheral point with respect to the current point not as the starting point. Then, the temporary list processing unit 320 may initialize the position information and the depth information of the peripheral point (operations 2440 and 2450).

In a case when the position information of each peripheral position is provided with the value other than "0" and when the surface score of the peripheral point is not present, the temporary list processing unit 320 may determine the current point as the ideal point, and may determine the peripheral point as the starting point. Then, the temporary list processing unit 320 may deliver the peripheral point to the base list processing unit 340 such that the peripheral point is added to the base list (operation 2460).

The temporary list processing unit 340 may end the processing of the temporary list when no single point is present on the temporary list.

Figure 11:
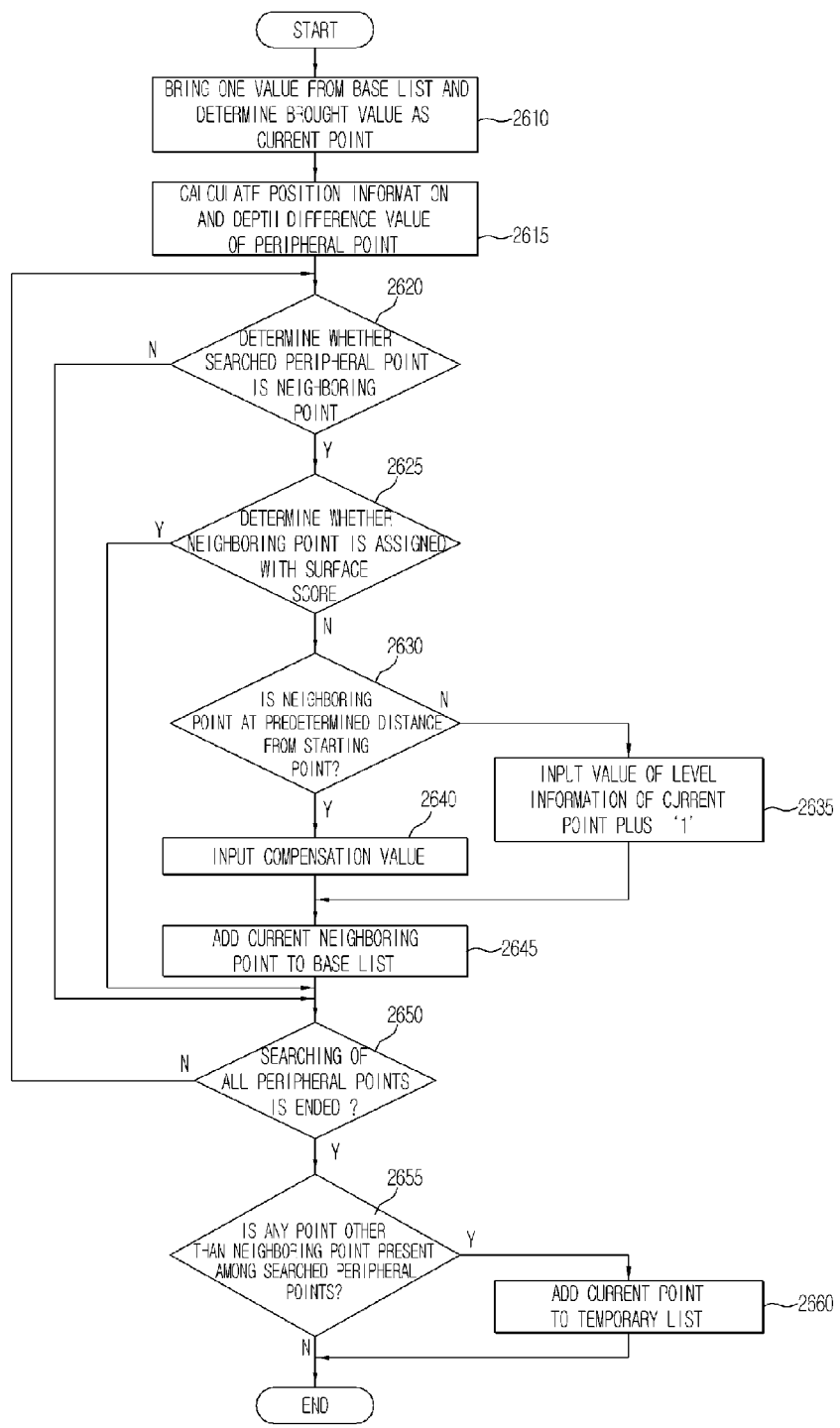
FIG. 11 illustrates a processing process of a base list in accordance with an embodiment of the present disclosure.

FIG. 11 is a flow chart showing a processing process of a base list in accordance with an embodiment of the present disclosure.

The base list processing unit 340 may assign a surface score or a compensation value to each of coordinates on the human image while having the starting point, which is delivered from the temporary list processing unit 320, as the initial point. The base list processing unit 340 may sequentially search the current point, which becomes the reference of searching, and eight peripheral points adjacent to the current point.

The base list processing unit 340 may assign a surface score or a compensation value to a neighboring point, and additionally designate the neighboring point as the base list. In a case when a candidate ideal point is found by the base list processing unit 340, the base list processing unit 340 may deliver the candidate ideal point to the temporary list processing unit 320 such that the candidate ideal point is added to the temporary list.

The base list processing unit 340 may bring a single value from the base list, and determine the single value as the current point. Then, the base list processing unit 320 may delete the value, which is brought, from the base list. The base list may be one of the starting point, which is added by the temporary list processing unit 320, and the neighboring point, which is added by the base list processing unit 340.

The base list processing unit 340 may sequentially search the current point, which becomes the reference for searching, and eight peripheral points adjacent to the current point. The peripheral point may be referred to as the point that is located within a one pixel distance in pixel units while having the position of the current point as a center. The number of the peripheral points per one current point may be eight (operation 2610).

The base list processing unit 340 may calculate the position information of the peripheral point. The base list processing unit 340 may calculate the depth difference value, which is referred to as the absolute value obtained by subtracting the depth information of the peripheral point from the depth information of the current point (operation 2615).

The base list processing unit 340 may sequentially search the current point and the peripheral points, and may determine whether the peripheral point, which is a subject of the searching, is a neighboring point.

The base list processing unit 340 may determine the peripheral point as the neighboring point in a case when the depth difference value is below a threshold value, and determine the peripheral point not as the neighboring point in a case when the depth difference value is equal to or larger than the threshold value (operation 2620).

The base list processing unit 340, in a case when the peripheral point is categorized as the neighboring point, may determine the peripheral point as the neighboring point, and may also determine whether the neighboring point is assigned with a surface score. The surface score may be the level value or the compensation value at the corresponding point. In a case when the neighboring point as such is already assigned with a surface score, the base list processing unit 340 may not assign a surface score again with respect to the neighboring point as such (operation 2625).

In a case when the neighboring point is not assigned with a surface score, the base list processing unit 340 may determine whether the current point is located within a certain distance in pixel units from the starting point. The base list processing unit 340 may determine whether the current point is located within a certain distance in pixel units from the starting point, by comparing the level information of the current point with the reference level (operation 2630).

In a case when the level information of the current point is below the reference level, the base list processing unit 340 may assign a compensation value to the neighboring point, which is currently being searched. In a case when the feature point is extracted by the feature point extraction unit 300, as to prevent the next feature point from being extracted in the near distance from the previous feature point, the base list processing unit 340 may assign a compensation value to the neighboring point. Then, the base list processing unit 340 may add the peripheral point, which is currently being searched, at the base list (operations 2640 and 2645).

In a case when the level information of the current point is equal to or above the reference level, the base list processing unit 340 may assign the neighboring point that is currently being searched with a value of the level information of the current point plus "1". Then, the base list processing unit 340 may add the peripheral point, which is currently being searched, to the base list (operations 2635 and 2645).

In a case when at least one depth difference value equal to or above the threshold value is present at the time when the base list processing unit 340 is ended with the searching of all the peripheral points, the base list processing unit 340 may determine the current point as the candidate ideal point, and deliver the candidate ideal point to the temporary list processing unit 320 such that the candidate ideal point is added to the temporary list (2655 and 2660).

The base list processing unit 340 may end the processing of the base list when none of the single starting point or the neighboring point is present on the base list.

Figure 12:
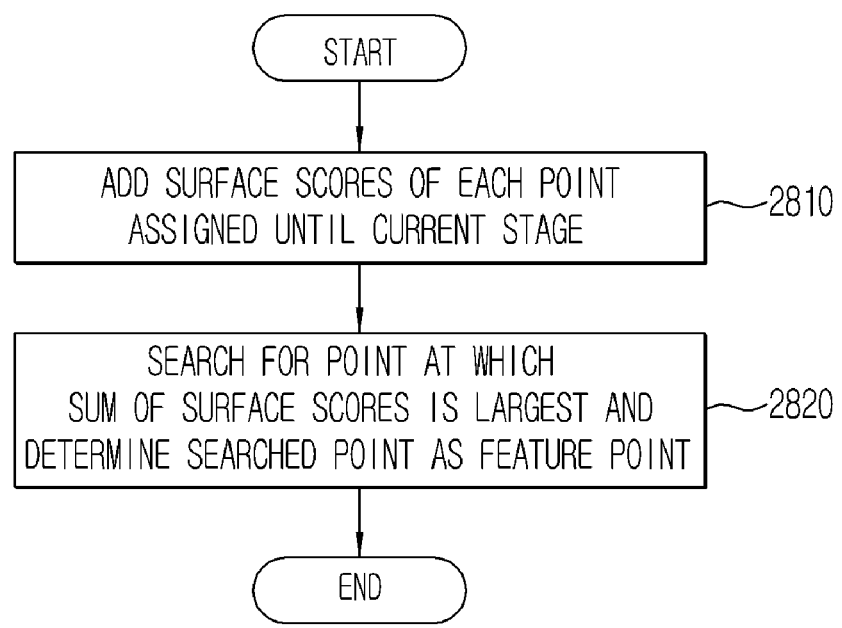
FIG. 12 illustrates a processing process of a feature point in accordance with an embodiment of the present disclosure.

FIG. 12 is a flow chart showing a processing process of a feature point in accordance with an embodiment of the present disclosure.

The feature point processing unit 360 may determine the coordinate value of the feature point based on the information obtained from the temporary list processing unit 302 and the base list processing unit 340. The feature point may be a point that is located at the farthest distance in pixel units from the starting unit.

The feature point processing unit 360 may determine the feature point after performing the processing process on all the elements of the temporary list and the base list. The feature point processing unit 360 may determine a point having at which value of the surface score or the sum of the surface scores is the largest as the feature point.

In a case when the center of gravity is determined as the starting point, the feature point processing unit 360 may determine a point, which is provided with the largest value of the surface score among all the pixels, as the first feature point. The first feature point may be referred to as a point that is located at the farthest distance in pixel units, while having the center of gravity as the starting point. At this time, the feature point processing unit 360, in a case when a plurality of points provided with the same value of the surface scores thereof is present, may select a certain one point from the plurality of points.

The feature point processing unit 360 may determine the first feature point as the starting point to search for the second feature point. That is, the previous feature point may be the starting point to search for the next feature point.

The feature point processing unit 360, after the first feature point is determined, may sequentially determine the point, which is located at the farthest distance in pixel units from the center of gravity as well as from the feature point found already, as the remaining feature point. That is, the feature point processing unit 360 may determine a point at which the sum of the surface score, which is assigned to each pixel at the current stage, and the surface score, which is assigned to each pixel to obtain the previous feature point, is the largest as the feature point of the current stage. At this time, the feature point processing unit 360, in a case when a plurality of points provided with the same value of the surface scores thereof is present, may select a certain one point among the plurality of points (operations 2810 and 2820).

Hereinafter, although all the components that compose the embodiment of the present disclosure are described to be coupled to each other to form a single unit or to be operated while coupled to each other, the present disclosure is not limited to the embodiment as such. That is, within the scopes of the objectives of the present disclosure, at least one of the components may be selectively coupled to be operated. In addition, while the each component may be implemented as an independent hardware, a portion of or all of the components may be selectively combined to be implemented as a computer program provided with a program module configured to perform a portion of or all of the functionalities that are combined at a single or at a plurality of hardware. The codes and the code segments that compose the computer program as such may be easily inferred by a concerned individual in the technical field of the present disclosure. The computer program as such is stored at a computer readable media, which may be read by a computer, to be read and executed by the computer, and thus the embodiment of the present disclosure may be implemented. As for the storage medium of the computer program, a magnetic recording media, an optical recording media, a carrier wave media may be included.

In addition, with respect to the expressions such as 'includes', 'composes', or 'is provided with' mentioned above, unless a particular contrary statement is present, the corresponding components may be inherent, and thus an interpretation is needed to be made that the other components are not being excluded while the other components are further included. All the expressions including technical or scientific expressions, unless defined differently, are provided with the same definitions as understood by those who are skilled in the art at which the present disclosure is included. The expressions being generally used as in the expressions defined in a dictionary are needed to be interpreted in line with the contextual definitions of the related technology, and unless clearly defined in the present disclosure, the expressions as such are not being interpreted in an abnormal manner or in an excessively formal manner.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An image processing apparatus for searching for a plurality of feature points by use of a depth image, the image processing apparatus comprising:
   an input unit configured to input a three-dimensional image having depth information;
   a feature point extraction unit configured to obtain a designated point from an object image extracted from the depth image to obtain a first feature point that is located at a substantially farthest distance, measured in pixel units, from the designated point, and to obtain other feature points that are located at substantially farthest distances directly from at least the first feature point and the designated point; and
   a control unit configured to control the input unit and the feature point extraction unit.

2. The image processing apparatus of claim 1, wherein the feature point extraction unit comprises
   a temporary list processing unit configured to process a temporary list by sequentially searching position information of a current point that serves as a reference of searching and position information of eight peripheral points adjacent to the current point, determining a starting point that serves as an initial point of the searching of at least one of the plurality of feature points, and delivering the starting point to a base list processing unit;
   the base list processing unit configured to process a base list by sequentially searching the current point and the peripheral points, and assigning a surface score or a compensation value to all coordinates on the object image while having the starting point delivered from the temporary list processing unit as the initial point; and
   a feature point processing unit configured to determine the at least one of the plurality of feature points based on information obtained from the temporary list processing unit and the base list processing unit.

3. The image processing apparatus of claim 2, wherein:
   the temporary list comprises one of the designated point, the at least one of the feature points, and a candidate ideal point that has a possibility of serving as an ideal point.

4. The image processing apparatus of claim 2, wherein:
   the temporary list processing unit is configured to sequentially search the position information of the current point and the position information of the peripheral points, and to determine the current point as the starting point in a case when the position information of each of the peripheral points is provided with a value of "0" and level information of the current point is provided with a value of "1".

5. The image processing apparatus of claim 2, wherein:
   the temporary list processing unit is configured to sequentially search the position information of the current point and the position information of the peripheral points, and in a case when the position information of the peripheral point is provided with a value that is not "0" and a surface score of the peripheral point is present, to determine the current point not as an ideal point and determine the peripheral point not as the starting point.

6. The image processing apparatus of claim 2, wherein:
   the temporary list processing unit is configured to sequentially search the position information of the current point and the position information of the peripheral points, and in a case when the position information of the peripheral point is provided with a value that is not "0" and a surface score of the peripheral point is not present, to determine the current point as the ideal point, and determine the peripheral point as the starting point.

7. The image processing apparatus of claim 2, wherein:
   the base list comprises one of a starting point that is added by the temporary list processing unit and a neighboring point that is added by the base list processing unit.

8. The image processing apparatus of claim 2, wherein:
   the base list processing unit is configured to sequentially search the current point and the peripheral points, to obtain a depth difference value that is referred to as an absolute value that is obtained by subtracting depth information of the peripheral point from depth information of the current point, and in a case when the depth difference value is below a threshold value, to determine the peripheral point as the neighboring point, and in a case when the depth difference value is equal to or larger than the threshold value, to determine the peripheral point not as the neighboring point.

9. The image processing apparatus of claim 2, wherein:
   the base list processing unit, in a case when the peripheral point is categorized as the neighboring point while the neighboring point is not assigned with a surface score and when the level information of the current point is equal to or larger a reference level, is configured to assign the neighboring point with a value of the level information of the current point plus "1".

10. The image processing apparatus of claim 2, wherein:
    the base list processing unit, in a case when the peripheral point is categorized as the neighboring point while the neighboring point is not assigned with a surface score and when the level information of the current point is below a reference level, is configured to assign a compensation value to the neighboring point.

11. The image processing apparatus of claim 2, wherein:
    the base list processing unit, in a case when the peripheral point is categorized as the neighboring point and when the neighboring point is already assigned with a surface score, is configured not to assign a surface value again to the neighboring point.

12. The image processing apparatus of claim 2, wherein:
    the base list processing unit, if at least one depth difference value that is equal to, or higher than, the threshold value is present at the time of the searching of all the peripheral points is completed, is configured to determine the current point as the candidate ideal point, and to deliver the candidate ideal point to the temporary list processing unit, the depth difference value referred to as the absolute value obtained by subtracting the depth information of the peripheral point from the depth information of the current point.

13. The image processing apparatus of claim 2, wherein:
    the feature point processing unit is configured to determine the at least one of the plurality of feature points after performing the processing process on all elements of the temporary list and the base list, and to set a region having a largest surface score or a largest sum of surface scores as the at least one of the plurality of feature points.

14. The image processing apparatus of claim 1, wherein the searching is for a feature point of a user of the image processing apparatus.

15. The image processing apparatus of claim 1, wherein the distance is measured in pixel units.

16. The image processing apparatus of claim 1, wherein the designated point is a center of gravity.

17. An image processing method by at least one processor of searching for a plurality of feature points by use of a depth image, the image processing method comprising:
receiving a three-dimensional image having depth information at a feature point extraction unit;
obtaining a designated point from an object image extracted from the depth image, and
obtaining a first feature point that is located at a substantially farthest distance, measured in pixel units, from the designated point, and obtaining other feature points that are located at substantially farthest distances directly from at least the first feature point and the designated point.

18. The image processing method of claim 17, wherein the obtaining of the feature point comprises:
processing, by a temporary list processing unit, a temporary list by sequentially searching position information of a current point that serves as a reference of the searching and position information of eight peripheral points adjacent to the current point, determining a starting point that serves as an initial point of the searching of the feature points, and delivering the starting point to a base list processing unit;
processing, by the base list processing unit, a base list by sequentially searching the current point and the peripheral points, and assigning a surface score or a compensation value to all coordinates on the object image while having the starting point delivered from the temporary list processing unit as the initial point; and
processing, by a feature point extraction unit, at least one of the plurality of feature points by determining the at least one of the plurality of feature points based on information obtained from the temporary list processing unit and the base list processing unit.

19. The image processing method of claim 18, wherein:
the temporary list comprises one of the designated point, at least one of the feature points, and a candidate ideal point that has a possibility of serving as an ideal point.

20. The image processing method of claim 18, wherein the processing of the temporary list comprises:
sequentially searching, by the feature point extraction unit, the position information of the current point and the position information of the peripheral points, and determining, by the feature point extraction unit, the current point as the starting point in a case when the position information of each of the peripheral points is provided with a value of "0" and level information of the current point is provided with a value of "1".

21. The image processing method of claim 18, wherein the processing of the temporary list comprises:
sequentially, by the feature point extraction unit, searching the position information of the current point and the position information of the peripheral points,
determining, by the feature point extraction unit, in a case when the position information of the peripheral point is provided with a value that is not "0" and a surface score of the peripheral point is present, the current point not as the ideal point and the peripheral point not as the starting point.

22. The image processing method of claim 18, wherein the processing of the temporary list comprises:
sequentially searching, by the feature point extraction unit, the position information of the current point and the position information of the peripheral points,
determining, by the feature point extraction unit, in a case when the position information of the peripheral point is provided with a value that is not "0" and a surface score of the peripheral point is not present, the current point as the ideal point, and
the peripheral point as the starting point.

23. The image processing method of claim 18, wherein:
the base list comprises one of the starting point that is added by the temporary list processing unit and a neighboring point that is added by the base list processing unit.

24. The image processing method of claim 18, wherein the processing of the base list comprises:
sequentially searching, by the feature point extraction unit, the current point and the peripheral points,
obtaining, by the feature point extraction unit, a depth difference value that is referred to as an absolute value that is obtained by subtracting depth information of the peripheral point from depth information of the current point, and determining, by the feature point extraction unit, the peripheral point as the neighboring point in a case when the depth difference value is below a threshold value, and
determining, by the feature point extraction unit, the peripheral point not as the neighboring point in a case when the depth difference value is equal to or larger than the threshold value.

25. The image processing method of claim 18, wherein:
in the processing of the base list, in a case when the peripheral point is categorized as the neighboring point while the neighboring point is not assigned with a surface score and when the level information of the current point is equal to or larger than a reference level, the feature point extraction unit assigns the neighboring point with a value of the level information of the current point plus "1".

26. The image processing method of claim 18, wherein:
in the processing of the base list, in a case when the peripheral point is categorized as the neighboring point while the neighboring point is not assigned with a surface score and when the level information of the current point is below a reference level, the feature point extraction unit assigns a compensation value to the neighboring point.

27. The image processing method of claim 18, wherein:
in the processing of the base list, in a case when the peripheral point is categorized as the neighboring point and when the neighboring point is already assigned with a surface score, the feature point extraction unit does not assign a surface value again to the neighboring point.

28. The image processing method of claim 18, wherein:
in the processing of the base list, if at least one depth difference value that is equal to or higher than the threshold value is present at the time of the searching of all the peripheral points is completed, the feature point extraction unit determines the current point as the candidate ideal point, and deliver the candidate ideal point to the temporary list processing unit, the depth difference value referred to as the absolute value that is obtained by subtracting the depth information of the peripheral point from the depth information of the current point.

29. The image processing method of claim 18, wherein:
in the processing of the at least one of the plurality of feature points, the feature point extraction unit determines the at least one of the plurality of feature points after performing the processing process on all elements of the temporary list and the base list, and set a region having a largest surface score or a largest sum of surface scores as the at least one of the plurality of feature points.

30. The image processing method of claim 18, wherein the searching is for a feature point of a user of an image processing apparatus.

31. The image processing method of claim 18, wherein the distance is measured in pixel units.

32. The image processing method of claim 18, wherein the designated point is a center of gravity.

* * * * *